United States Patent Office 2,839,662
Patented June 17, 1958

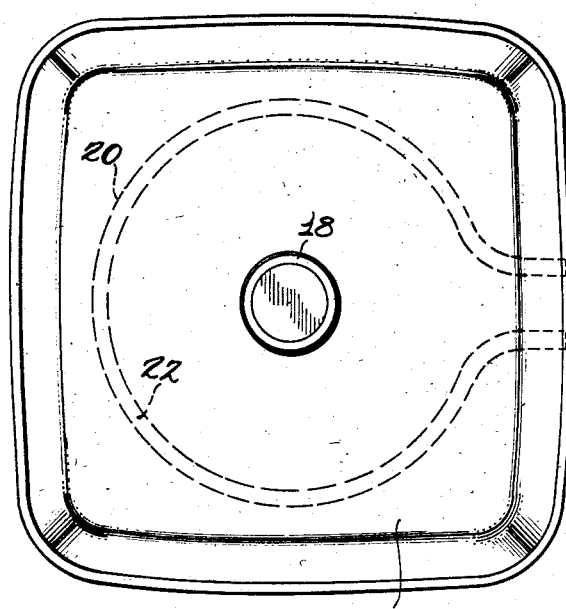
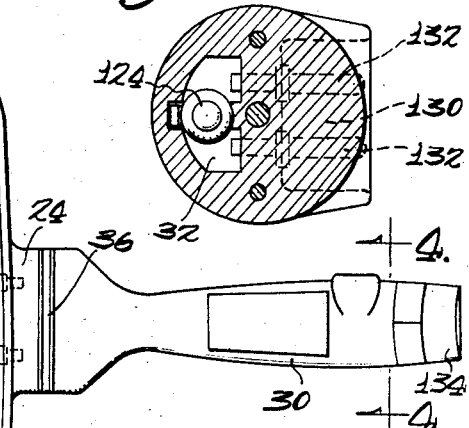
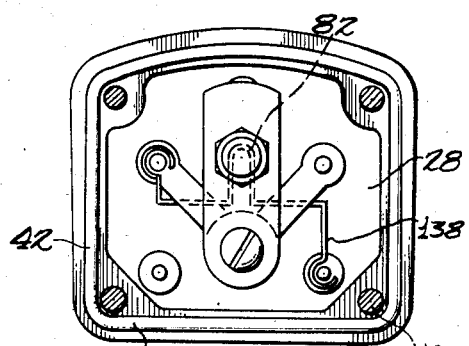
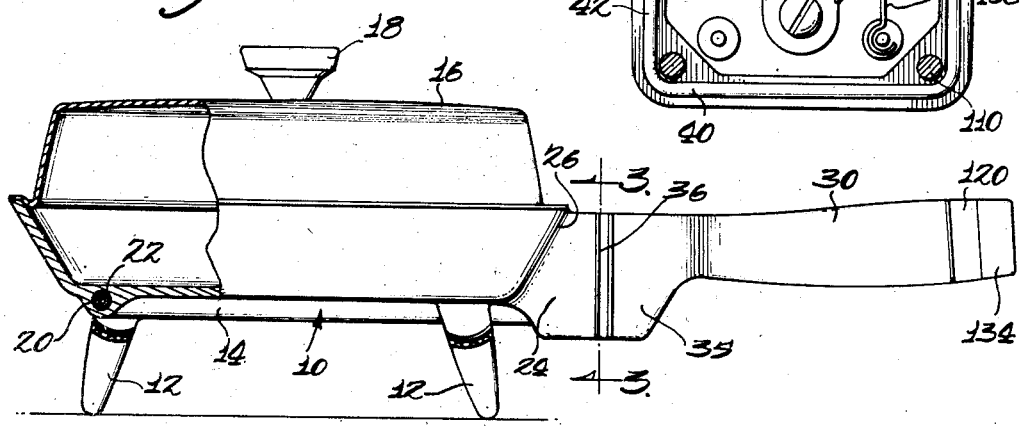

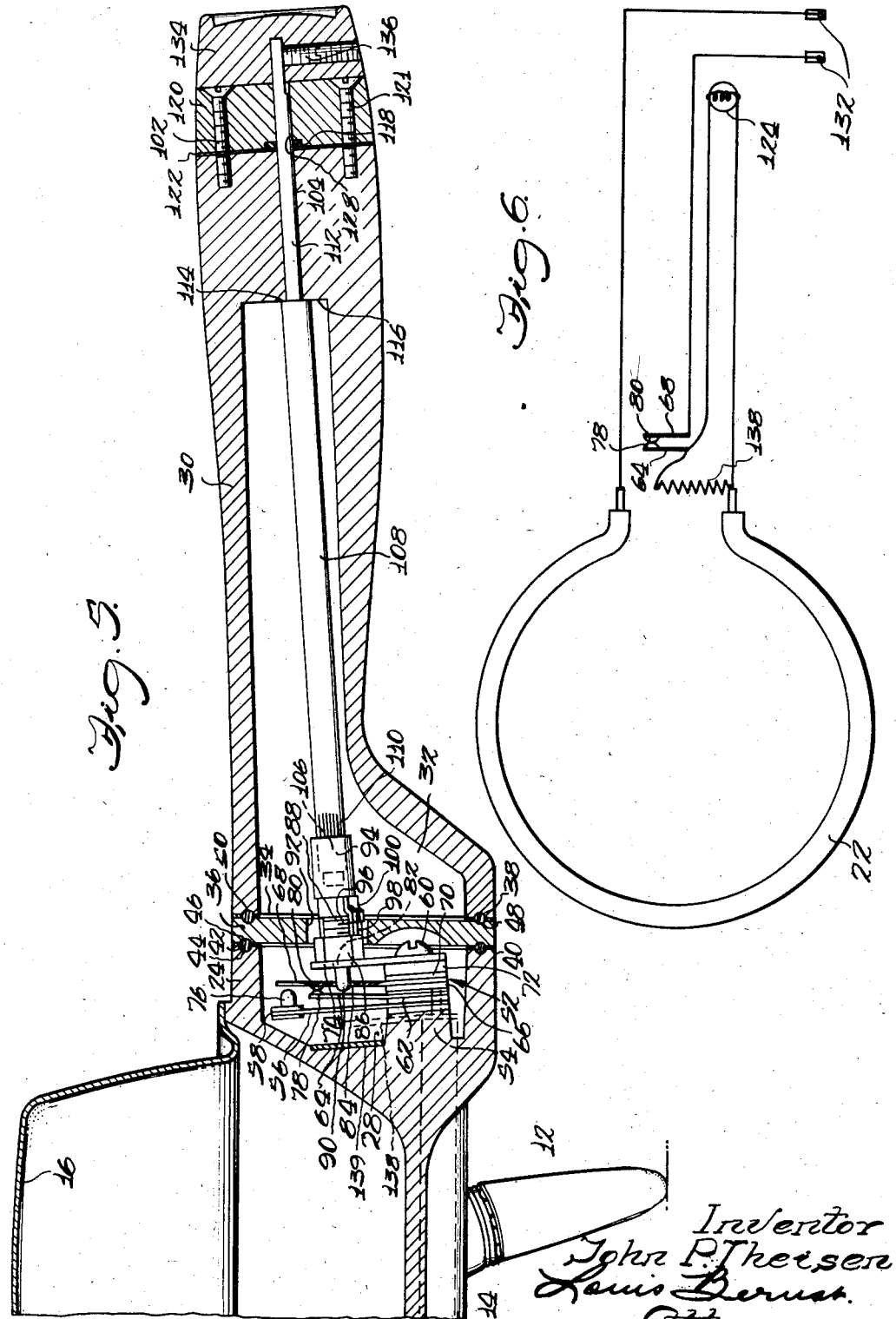

2,839,662

ELECTRIC COOKING UTENSIL

John P. Theisen, Jacksonville, Ill., assignor, by mesne assignments, to Knapp-Monarch Company, St. Louis, Mo., a corporation of Delaware Application October 18, 1954, Serial No. 462,728

5 Claims. (Cl. 219—44)

The present invention relates to cooking utensils, and particularly cooking utensils which are electrically heated.

Electrically heated cooking utensils have become popular for use in both the home and restaurants. They permit one to cook at any location in which electrical power is available, and many persons find this semi-portability of electrical cooking utensils extremely advantageous. Further, some foods may be cooked more advantageously in an electrically heated cooking utensil than in any other, since electrically heated cooking utensils are readily constructed with thermostatic controls which limit the temperature applied to the food being processed to a much narrower range than is readily practical with other types of cooking utensils.

The force of these advantages is most readily demonstrated with cooking utensils which are provided with self-contained electrical heating elements, since these utensils are most readily moved, and due to the close proximity of the heating element and the food being prepared, control the temperature range to which the food is subjected more closely than other devices. However, the cooking utensils with self-contained heating elements which are presently in use are difficult to clean after use, since the cooking utensil may not be immersed in a cleaning liquid, such as water, for the purpose of removing grease and dirt from the utensil. It is therefore an object of the present invention to provide a cooking utensil having an electrical heating element self-contained therein that may be immersed in a fluid.

Since one of the big advantages of cooking utensils with electrical heating elements is that they may be constructed inexpensively with thermostats to control the temperature applied to the food being prepared in the utensil, it is highly desirable that the cooking utensil be provided with a self-contained heating element and a thermostat which is manually adjustable from the exterior of the cooking utensil over a relatively wide temperature range. It is therefore a further object of the present invention to provide a cooking utensil with a self-contained heating element and an adjustable thermostat which may be immersed in a liquid.

It is a further object of the present invention to provide a liquid-immersible cooking utensil with a self-contained electrical heating element which may be simply and inexpensively fabricated.

The significance of these objects, and further objects of the invention, will readily become apparent upon a further reading of this disclosure, particularly when viewed in the light of the drawings, in which:

Figure 1 is a plan view of a cooking utensil constructed according to the teachings of the present invention;

Figure 2 is a side elevational view, partly cut away and in section, of the cooking utensil illustrated in Figure 1;

Figure 3 is a sectional view taken along line 3—3 of Figure 2;

Figure 4 is a sectional view taken along line 4—4 of Figure 1;

Figure 5 is a vertical sectional view of a fragment of the cooking utensil shown in Figures 1 through 4; and Figure 6 is a schematic electrical diagram of the circuit for heating the cooking utensil illustrated in Figures 1 through 5.

The invention is illustrated in the figures as an electrically heated frying pan, although it will be understood that the invention is not limited by the pan set forth and may be utilized in electrically heated kettles, ovens, and the like. As illustrated, the cooking utensil includes a vessel 10 in the form of a shallow pan which is provided with four outwardly extending feet 12 attached to the bottom 14 of the vessel 10 to permit the vessel to be placed upon a working surface. The legs 12 are constructed of thermal insulating material, such as plastic, in order to prevent the conduction of heat from the bottom 14 of the vessel 10 to a working surface. The vessel 10 is also provided with a cover 16 having a knob 18 of thermally insulating material to facilitate removal of the cover 16. The cover 16 is constructed of material having good thermal conductivity in order to completely surround the food being prepared in an essentially equi-temperature region.

The bottom 14 of the vessel 10 is provided with an annular channel 20 which forms a loop adjacent to the perimeter of the bottom 14 of the vessel 10. An electrical heating element 22 of conventional construction is disposed within the channel 20. The channel 20 terminates at both ends within a rectangular housing 24 extending outwardly from one side 26 of the vessel 10. The housing 24 is provided with a cavity 28 therein, and the channel 20 terminates at both ends in the cavity 28.

A hollow handle 30 is provided with a cavity 32 at one end, and the handle 30 is attached to the housing 24 of the vessel 10. The end 34 of the handle 30 adjacent to the housing 24 is also rectangular in shape and conforms to the housing 24. A rectangular spacer 36 having the same size and shape as the housing 24 and the end 34 of the handle 30 is disposed between this end 34 of the handle 30 and the housing 24, and a liquid-tight seal is provided between the handle 30 and spacer 36 by a gasket 38, and between the housing 24 and the spacer 36 by a gasket 40. As illustrated in Figure 3, the gasket 40 is rectangular in shape having a width approximately equal to that of the walls of the housing 24, and it is provided with a semi-circular portion 42 on each side thereof. The semi-circular portions 42 are disposed within grooves 44 centrally disposed within the ends of the walls of the housing 24 and conforming grooves 46 in the spacer 36 adjacent to the periphery thereof. The gasket 38 is constructed in a manner identical with the gasket 40, and both gaskets are constructed of rubber, although it will be understood that other suitable gasket materials may be used. There is a groove 48 in the surface of the spacer 36 confronting the handle 30 conforming to the groove 46 on the opposite surface of the spacer 36, and in like manner a conforming groove 50 is disposed in the end 34 of the handle 30. In this manner, the handle 30 is attached to the vessel 10 in a liquid-tight manner. It is to be noted that the vessel 10 is constructed of thermally conducting material which is liquid-impermeable, copper or aluminum are two examples of suitable materials. The spacer 36 and the handle 30 must also be constructed of liquid-impermeable materials, but at least a portion of the handle 30 should be constructed of a material having low thermal conductivity, plastic and wood being suitable examples for this portion.

A thermostat 52 is disposed within the cavity 28 in the housing 24. The vessel 10 has a protruding nub 54 extending into the cavity 28, and a bimetallic strip 56 is mounted at one end to the nub. The other end 58 of the bimetallic strip is disposed freely within the cavity 28, so that it may move away from the adjacent surface of the vessel 10 as the temperature of the nub 54 increases. The bimetallic strip 56 is secured to the nub 54 by a screw 60 which is threaded into the nub 54. Between the bimetallic strip 56 and the screwhead of screw 60 are disposed on the screw 60, in sequence, a disc 62 of electrically insulating material, a first contact strip 64, a second disc 66 of electrically insulating material, a second contact strip 68, a third disc 70 of electrically insulating material, a washer 72, and a support bar 74. The bimetallic strip 56, first contact strip 64, second contact strip 68 and support member 74 are aligned, and the bimetallic strip 56 and second contact strip 68 extend above the first contact strip 64. The end 58 of the bimetallic strip 56 is provided with a knob 76 of electrically insulated material extending outwardly from the bimetallic strip 56 toward the second contact strip 68, and adapted to contact the contact strip 68 to separate the contact strips 64 and 68 when the temperature of the nub 54 becomes sufficient. The contact strip 64 and contact strip 68 are provided with contact points 78 and 80 which confront each other and are in contact with each other when the temperature of the nub 54 is sufficiently low.

The support member 74 is provided with an aperture 82 therein which confronts an aperture 84 in the second contact strip 68. A threaded nut 86 is secured to the surface of the support member 74 opposite to the second contact strip 68 and aligned with the apertures 82 and 84. A threaded shaft 88 is rotatably disposed within the threaded nut 86, and the shaft 88 is provided with an end portion 90 of smaller diameter which extends through the aperture 84 in the second contact strip 68 to confront the first contact strip 64. Rotation of the threaded shaft 88 within the nut 86 therefore advances or retracts the end portion 90 of the shaft 88, as will be hereinafter further described. The shaft 88 and a portion of the nut 86 extend through the spacer 36 by means of an aperture 92. A splined hub 94 is attached to the end of the shaft 88, and a spring 96 in the form of a helix is disposed about the shaft 88 in abutment with the threaded nut 86 and the splined hub 94 to provide a tension upon the shaft 88 to rotation. The nut 86 has a protruding portion 98 extending outwardly therefrom into the aperture 92, and a stop bar 100 is secured to the hub 94 to abut the protruding portion 98 and provide a rotational stop on the shaft 88.

The end of the handle 30 opposite to the end 34, designated 102, has a bore 104 of smaller diameter than the diameter of the socket 106 in the hub 94. A rod 108 provided with a splined end 110 and a restricted portion 112 at the other is disposed within the cavity 32 of the handle, the restricted portion 112 of the rod 108 being disposed within the bore 104 and the splined end 110 being disposed within the splined socket 106 of the hub 90. The splined end 110 of the rod 108 forms a slip fit within the splined socket 106 of the hub 94, and the handle 30 is secured to the housing 24 by means of four screws 110 which are threaded into the housing 24. As a result, assembly of the cooking utensil is simplified since the rod 108 need merely be aligned with the splined socket 106 and the screws 110 tightened to seal the handle to the vessel 10. The shoulder 114 between the restricted portion 112 of the rod 108 and the other portions of the rod 108 abuts the surface 116 of the cavity 32 to retain the rod 108 in engagement with the hub 94. A lock washer 118 is disposed adjacent to the end 102 of the handle 30 and is attached to the rod 108 to prevent the rod from being translated relative to the handle 30.

The restricted portion 112 of the rod 108 is snugly journaled within the bore 104 of the handle 30, in order to prevent leakage of liquid through the bore 104. While it has not been found to be necessary in the present construction of the invention, it may be desirable in some constructions to provide packing between the rod 112 and the bore 104 to avoid leakage. It is also to be noted that the liquid-tight journaling of the restricted portion 112 of the rod 108 in the bore 104 increases the difficulty experienced in assembling the handle 30 onto the vessel 10, and it may be desirable in some cases to provide a larger bore 104 than required by the restricted portion 112 of the rod 108 in order to facilitate construction. It is to be noted that in this event, the entire cooking utensil cannot be immersed in a liquid, but only the end of the handle 30 need be retained out of the liquid, thus greatly facilitating cleaning and overcoming the disadvantages of the existing constructions.

A plastic disc 120 is sealed to the end 102 of the handle by screws 121, and a gasket 122 is provided between the handle 30 and the disc 120. The disc 120 is constructed of light permeable material, and a light bulb 124 is disposed within the cavity 32 of the handle 30 to illuminate this disc 120. The disc 120 is provided with a central aperture 128 aligned with the bore 104. As illustrated in Figure 4, the cavity 32 extends to the end 102 of the handle 30 for purposes of containing the light bulb 124 and the electrical wiring.

Adjacent to the end 102 of the handle 30 and at one side of the exterior surface of the handle 30 is a recess 130 containing a pair of spaced electrically conducting pins 132 which extend into the cavity 32 and permit an electrical plug to make contact with the heating element 22 of the cooking utensil. As a result of the recess 130 being disposed at the end of the handle 30 the electrical conductors to the cooking utensil do not interfere with cooking operations. A knob 134 of light permeable plastic material is secured to the end of the restricted portion 112 of the rod 108 by a set screw 136, and rotation of the knob 134 is effective to position the contact strips 64 and 68 relative to each other.

As illustrated in Figure 6, one of the terminal pins 132 is directly connected to one end of the heating element 22, and the other terminal pin 132 is connected to the contact strip 68. The first contact strip 64 is connected to the other end of the heating element 22 through a resistor 138, and the lamp 124 is connected in parallel with the resistor 138. As a result of this construction, the heating element 122 is energized only when the contact points 78 and 80 on the contact strips 64 and 68 are closed, and during this period of time, a sufficient voltage drop appears across resistor 138 to cause the lamp 124 to light. It is thus clear that light will be visible through the plastic disc 120 and knob 134 only when the heating element 22 is in operation. The knob 134 may be provided with temperature markings around the periphery thereof which are clearly visible when the lamp 124 is energized. Furthermore, the resistor 138 is positioned in the cavity 28 between the bi-metallic strip 56 and a strip 139 of electrical insulating material, such as mica, disposed adjacent to the side 26 of the vessel 10. As a result of this construction, the heat generated in the resistor 138 tends to reduce overshoot of the bi-metallic strip 56.

The bimetallic strip 56 is so positioned that at room temperatures the contacts 78 and 80 abut each other forming a closed circuit permitting the energization of the heating element 22, except when the knob 136 has been turned in its maximum counter-clockwise position, permitting the threads of the nut 86 to move the end portion 90 of the shaft 88 into contact with the contact strip 64 to position the contact 78 out of the range of movement of the contact 80. Clockwise rotation of the knob 136 then adjusts the position of contact 78 to permit contact 80 to abut it. As the vessel 10 heats up, the bimetallic strip 56 moves its end 58 toward the second contact strip 68, and when the vessel 10 becomes sufficiently hot, the knob 76 at the end 58 of the bimetallic strip 56 will abut the second contact strip 68 and open the contacts 78 and 80, thus de-energizing the heating element and controlling the temperature of the vessel 10.

The foregoing disclosure of the invention has been specific, and the man skilled in the art will readily devise many modifications and embodiments within the scope of the present invention. It is therefore intended that the scope of the present invention be not limited by the foregoing disclosure, rather only by the appended claims.

What is claimed is:

1. In combination, an electrically energized cooking vessel of metal having formed integrally therewith a housing extending outwardly from one side of the vessel and surrounding a cavity within which is mounted thermostatically controlled switch means for said electrically energized vessel; an elongated hollow handle of heat insulating material for connection at a pre-selected attitude to said cooking vessel, one end of said handle adapted to be connected to said vessel, the extended end of said handle carrying thereat a selectively adjustable thermostat control knob rotatable about an axis extending longitudinally of said handle; a ring-like spacer member disposed between the terminal end of said outwardly extending housing on said vessel and the terminus of said one end of said handle, with one side of said spacer facing the terminus of the housing and the other side of said spacer facing the terminus of the handle; one pair of said facing sides, of the housing and spacer and of the handle and spacer, having formed therein a pair of similarly shaped and opposed recesses; a liquid-tight gasket disposed between said one pair of facing sides, and arranged to enter the similarly shaped recesses in said one pair of facing sides, and liquid-tight gasket means disposed between the other said pair of facing sides; and means clamping the handle, spacer, vessel, and gaskets therebetween together to provide a liquid-tight cooking vessel that is immersible in liquid for cleaning purposes.

2. A device as set forth in claim 1 including means defining a liquid-tight seal between the handle and the control knob thereon.

3. A device as set forth in claim 1 including shaft means connected to said control knob and rotatable therewith, means on said handle journalling said shaft means, and said shaft means extending through said hollow handle and through said ring-like spacer into the cavity within said housing for cooperating with, and varying, the thermostatic control of the switch means within said housing.

4. In combination, an electrically energized cooking vessel of metal having formed integrally therewith a housing extending outwardly from one side of the vessel and surrounding a cavity within which is mounted thermostatically controlled switch means for said electrically energized vessel; an elongated hollow handle of heat insulating material for connection at a pre-selected attitude to said cooking vessel, one end of said handle adapted to be connected to said vessel, the extended end of said handle carrying thereat a selectively adjustable thermostat control knob rotatable about an axis extending longitudinally of said handle; a ring-like spacer member disposed between the terminal end of said outwardly extending housing on said vessel and the terminus of said one end of said handle, with one side of said spacer facing the terminus of the housing and the other side of said spacer facing the terminus of the handle, each pair of facing sides, of the housing and spacer and of the handle and spacer, having formed therein a pair of similarly shaped and opposed recesses; a liquid-tight gasket disposed between each pair of facing sides, and arranged to enter the similarly shaped recesses in said pair of facing sides; and means clamping the handle, spacer, vessel, and gaskets therebetween together to provide a liquid-tight cooking vessel that is immersible in liquid for cleaning purposes.

5. A device as set forth in claim 4 wherein said means for clamping the handle, spacer, vessel, and gaskets therebetween together consists of screw threaded members located inwardly of the gaskets.

References Cited in the file of this patent

UNITED STATES PATENTS

| | | | |
|---|---|---|---|
| 1,257,599 | Hadaway | Feb. 26, | 1918 |
| 1,597,241 | Marsden | Aug. 24, | 1926 |
| 1,680,621 | Kercher | Aug. 14, | 1928 |
| 2,159,869 | Thomas | May 23, | 1939 |
| 2,350,148 | Bostwick | May 30, | 1944 |
| 2,571,782 | Swenson | Oct. 16, | 1951 |
| 2,629,042 | Burleyson | Feb. 17, | 1953 |
| 2,657,300 | Sullivan | Oct. 27, | 1953 |
| 2,694,766 | Ireland | Nov. 16, | 1954 |
| 2,744,995 | Jepson | May 8, | 1956 |

FOREIGN PATENTS

| | | | |
|---|---|---|---|
| 664,113 | Great Britain | Jan. 2, | 1952 |